(12) United States Patent
Howard et al.

(10) Patent No.: US 6,254,035 B1
(45) Date of Patent: Jul. 3, 2001

(54) SYNCHRONIZED DOCKING SYSTEM

(75) Inventors: Richard T. Howard; Michael L. Book; Thomas C. Bryan, all of Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/228,071

(22) Filed: Dec. 10, 1998

(51) Int. Cl.[7] .................................................. B64G 1/64
(52) U.S. Cl. ............................................................ 244/161
(58) Field of Search ............................... 244/159, 158 R, 244/161, 114 R; 320/2

(56) References Cited

U.S. PATENT DOCUMENTS

| | | | |
|---|---|---|---|
| 3,535,543 | * 10/1970 | Dailey | 244/159 |
| 4,249,159 | * 2/1981 | Stasko | 244/114 R |
| 4,295,740 | * 10/1981 | Sturges, Jr. | 244/161 |
| 4,834,531 | * 5/1989 | Ward | 244/161 |
| 5,109,345 | * 4/1992 | Dabney et al. | 244/161 |
| 5,291,195 | * 3/1994 | Gross | 244/161 |
| 5,646,500 | * 7/1997 | Wilson | 320/2 |
| 5,734,736 | * 3/1998 | Palmer et al. | 244/161 |

* cited by examiner

*Primary Examiner*—Galen L. Barefoot
(74) *Attorney, Agent, or Firm*—James J. McGroary; Robert L. Broad, Jr.

(57) ABSTRACT

A synchronized target subsystem for use in an automated docking system for docking a chase vehicle with a target vehicle wherein the chase vehicle is provided with a video camera for feeding digitized frames to an image processing unit which feeds signals to a control circuit. The control circuit turns on the video camera to digitize a background frame which will include the target vehicle. After the camera grabs the background frame the control circuit turns on a light, which is carried by carried on the chase vehicle and aimed at the target vehicle, and signals the video camera to digitize a foreground frame. A light sensing circuit on the target vehicle receives the light from the chase vehicle and connects a power supply to lights on the target vehicle such that when the foreground frame is digitized the Lights on the target vehicle will show in the foreground frame. The image processing unit subtracts the background frame from the foreground frame and provides a docking signal.

6 Claims, 1 Drawing Sheet

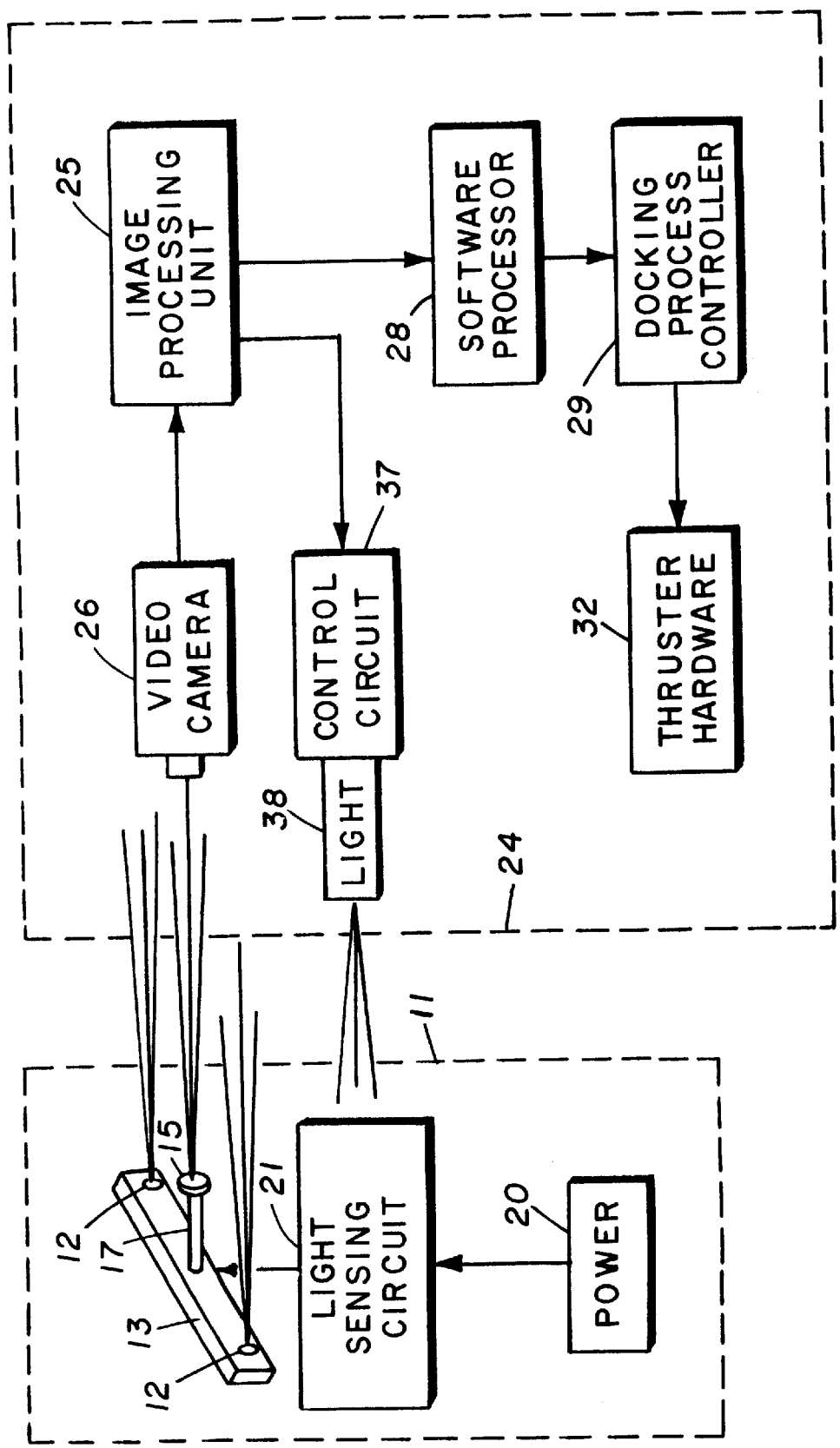

SYNCHRONIZED DOCKING SYSTEM

ORIGIN OF THE INVENTION

This invention was made by employees of the United States Government and may be manufactured and used by or for the Government for governmental purposes without the payment of any royalties.

BACKGROUND OF THE INVENTION

1. Field of the Invention

This invention relates to autonomous docking or station keeping systems for space vehicles.

2. Prior Art

U.S. Pat. No. 5,490,075 discloses an automated clocking system wherein Global Sensing receivers on the target and the chase vehicle synchronize lights on the target and a video imaging device on the chase vehicle such that these lights and the video imaging device operate in synchronism with each other to guide the chase vehicle to the target. A disadvantage of this system is that it requires more equipment (Global Position Sensing receivers on both the target and the chase vehicle).

U.S. Pat. No. 5,109,345 discloses an autonomous docking system which uses laser diodes mounted on a chase vehicle for directing light toward reflectors mounted on a target vehicle for docking the chase vehicle with the target vehicle. The disadvantage of this system is that the reflected light is much dimmer that an active light.

SUMMARY OF THE INVENTION

A synchronized target subsystem for use in an automated docking or station keeping system for docking a chase vehicle with a target vehicle wherein the chase vehicle is provided with a video camera for feeding digitized frames to an image processing unit which feeds signals to a control circuit. The control circuit turns on the video camera to digitize a background frame which will include the target vehicle. After the camera grabs the background frame the control circuit turns on a light, which is carried by the chase vehicle and aimed at the target vehicle, and signals the video camera to digitize a foreground frame. A light sensing circuit on the target vehicle receives the light from the chase vehicle and connects a power supply to lights on the target vehicle such that when the foreground frame is digitized the lights on the target vehicle will show in the foreground frame. The image processing unit subtracts the background frame from the foreground frame and provides a docking or station keeping signal.

DETAILED DESCRIPTION OF THE DRAWING

The single FIGURE of the drawing is a schematic drawing showing the components which make up the subsystem of this invention.

DETAILED DESCRIPTION OF THE INVENTION

Referring now in detail to the drawing, there is shown a system of lights carried by a target vehicle 11. The system of lights includes lights 12 mounted on a base plane 13 at a spaced distance apart. A post 17 located between the lights 12 projects forward of the base plane 13 and carries a third light 15 mounted on the end of the post 17.

A power supply 20 on the target vehicle 11 is connected through a light sensing circuit 21 to power the lights 12 and 15 when the light sensing circuit senses light above a certain threshold or intensity. If desired, the light from the light 38 may be modulated at a predetermined frequency, with the light sensing circuit being responsive to the modulated light.

A video camera 26 carried by a chase vehicle 24 to be docked with the target vehicle 11 provides video frames of the target vehicle and its lights 12 and 15. The video camera feeds signals to an image processing unit 25. The image processing unit 25 sends docking or station keeping signals to a software processor 28 which controls a docking process controller 29. The docking process controller 29 operates thruster hardware 32. The docking is carried out as described in U.S. Pat. No. 5,490,075, which patent is hereby incorporated herein by reference.

In docking a chase vehicle with a target vehicle, it is desired that a video camera digitizes two adjacent frames and subtracts one from the other to obtain a docking signal. If lights on the target vehicle are off in a first frame and on in a second adjacent frame the subtraction of the first frame from the second results in a frame showing only the lights on the target vehicle. This eliminates any spurious signals resulting from light other than the lights on the target vehicle.

The image processing unit 25 also operates a control circuit 37 which controls the video camera 26 and a light 38 positioned on the chase vehicle 24 to be directed at the target vehicle 11. At a signal from the image processing unit 25 the control circuit 37 signals the video camera 26 to digitize a background video frame with the lights 12 and 15 off. After the background frame is digitized the control circuit 21 turns on the light 38 carried by the chase vehicle 24 and signals the video camera 26 to digitize a foreground frame. The light from the light 38 is sensed by the light sensing circuit 21 on the target vehicle 11 to turn on the lights 12 and 15. The foreground video frame digitized by the camera 26 will show the illuminated lights 12 and 15 on the target vehicle.

The background frame is subtracted from the foreground frame by the image processing unit to provide a docking or station keeping signal which is fed to the software processor. This process is continued until the docking is completed it is no longer desired to keep the chase vehicle at a particular relationship to the target vehicle.

What is claimed is:

1. A synchronized target subsystem for use in automated docking systems wherein a chase vehicle is docked with a target vehicle, said synchronized target subsystem comprising, a. a plurality of lights mounted on the target vehicle, b. A power supply carried by the target vehicle, c. a light sensing circuit mounted on the vehicle for sensing light above a predetermined intensity, said light sensing circuit being adapted to connect the power supply to said lights when said light is sensed, d. a video camera carried by the chase vehicle for digitizing background and foreground frames, e. an actuating light mounted on the chase vehicle in a position to direct light at the target vehicle, f. an image processing unit connected to the camera, g. a control circuit connected to the image processing unit for receiving a signal from said image processing unit, said control circuit being connected to the video camera and the actuating light for and signaling the video camera to digitize a background frame while the lights on the target vehicle are off, said control circuit then turning on the light on the chase vehicle and signaling the video camera to digitize a foreground frame while the lights on the target vehicle are on, said video camera feeding both frames to the image processing unit for subtraction of the background frame from the foreground frame to provide a docking signal.

2. The system of claim 1 wherein the chase vehicle is provided with means for guiding the chase vehicle to a docked relationship with the target vehicle.

3. The system of claim 2 wherein the guiding means is controlled by signals from the image processing unit.

4. The system of claim 3 wherein the guiding means includes a software processor connected to the image processing unit, a docking process controller connected to the software processor and thruster hardware connected to the docking process controller.

5. The system of claim 4 wherein the light from the actuating light is modulated at a predetermined frequency.

6. A synchronized target subsystem for use in automated docking systems wherein a chase vehicle is docked with a target vehicle, said synchronized target subsystem comprising;

a plurality of light sources carried by the target vehicle for transmitting a plurality of light signals, a single video camera carried by the chase vehicle for directly receiving said light signals from the target vehicle and for digitizing background and foreground frames based on said light signals, an image processing unit, carried by the chase vehicle and connected to said video camera, for processing said background and foreground frames, a power supply carried by the target vehicle for supplying power to the plurality of light sources, a light sensing circuit carried by the target vehicle for sensing light above a predetermined intensity, said light sensing circuit being adapted to connect the power supply to the plurality of light sources when said light is sensed, an actuating light source carried by the chase vehicle for directing light at the target vehicle, and a control circuit connected to the image processing unit for receiving a signal from said image processing unit, said control circuit being connected to the video camera and the actuating light source for signaling the video camera to digitize a background frame while the light sources on the target vehicle are off, said control circuit then turning on the actuating light source on the chase vehicle and signaling the video camera to digitize a foreground frame while the light sources on the target vehicle are on, said video camera feeding both frames to the image processing unit for subtraction of the background frame from the foreground frame to provide a docking signal.

\* \* \* \* \*